US012526621B2

United States Patent
Kuravangi-Thammaiah et al.

(10) Patent No.: US 12,526,621 B2
(45) Date of Patent: *Jan. 13, 2026

(54) SYSTEM AND METHOD FOR UNIFIED DATA REPOSITORIES AND APPLICATION PROGRAMMING INTERFACES FOR AVOIDING SEGMENTATION SYNCHRONIZATION

(71) Applicant: Verizon Patent and Licensing Inc., Basking Ridge, NJ (US)

(72) Inventors: Shanthala Kuravangi-Thammaiah, Keller, TX (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,489

(22) Filed: Mar. 26, 2024

(65) Prior Publication Data
US 2024/0244421 A1 Jul. 18, 2024

Related U.S. Application Data (63) Continuation of application No. 17/474,369, filed on Sep. 14, 2021, now Pat. No. 11,997,755.

(51) Int. Cl.
*H04W 8/22* (2009.01)
*H04W 84/04* (2009.01)

(52) U.S. Cl.
CPC ............ *H04W 8/22* (2013.01); *H04W 84/042* (2013.01)

(58) Field of Classification Search
CPC ....... H04W 8/22; H04W 8/18; H04W 84/042; H04W 8/20
See application file for complete search history.

(56) References Cited

U.S. PATENT DOCUMENTS

| | | | |
|---|---|---|---|
| 11,564,096 B2* | 1/2023 | Basu Mallick | H04L 1/007 |
| 2016/0205542 A1 | 7/2016 | Yavuz et al. | |
| 2020/0204962 A1 | 6/2020 | Hua et al. | |
| 2020/0228986 A1* | 7/2020 | Anandan | H04W 12/08 |
| 2020/0296571 A1 | 9/2020 | Puente Pestaña et al. | |
| 2020/0367141 A1 | 11/2020 | Cakulev et al. | |
| 2021/0075631 A1 | 3/2021 | Liao | |
| 2021/0099364 A1 | 4/2021 | Bartolomé Rodrigo et al. | |
| 2021/0195506 A1* | 6/2021 | Bartolomé Rodrigo | H04W 24/02 |

(Continued)

OTHER PUBLICATIONS

"3rd Generation Partnership Project; Technical Specification Group Core Network and Terminals; 5G System; Network Function Repository Services; Stage 3 (Release17)", 3GPP TS 29.510 V17.2.0 (Jun. 2021). 256 pages.

(Continued)

*Primary Examiner* — Congvan Tran (57) ABSTRACT

A system includes a Network Repository Function in a segment of a Fifth Generation (5G) network. The NRF is configured to receive a registration request from a Unified Data Repository (UDR). The request indicates that the UDR includes both UE-specific data and non-UE specific data. The NRF is further configured to: store registration information provided in the registration request; receive a request from a network function within the segment and send a response to the request based on the registration information.

20 Claims, 8 Drawing Sheets (56) References Cited

U.S. PATENT DOCUMENTS

2022/0060325 A1* 2/2022 Castellanos Zamora ..................... H04W 8/20
2022/0167260 A1* 5/2022 Chun .................... H04W 60/04
2022/0337558 A1* 10/2022 Khare ................. H04L 63/0281
2024/0057010 A1* 2/2024 Minokuchi ........... H04W 60/04

OTHER PUBLICATIONS

"3rd Generation Partnership Project; Technical Specification Group Core Network and Terminals; 5G System; Usage of the Unified Data Repository service for Policy Data, Application Data and Structured Data for Exposure; Stage 3 (Release 17).", 3GPP TS 29.519 V17.3.0 (Jun. 2021). 180 pages.

"3rd Generation Partnership Project; Technical Specification Group Services and System Aspects; System architecture for the 5G System (SGS); Stage 2 (Release 17)", 3GPP TS 23.501 V17.1.1 (Jun. 2021).

* cited by examiner

| RESOURCE URI | NAME |
|---|---|
| 1  {apiRoot}/nudr-dr/<apiVersion> | |
| 2      /policy-data | |
| 3          /ues | |
| 4              /{ueId} | Policy Data for Individual UE 512 |
| 5                  /am-data | Access and Mobility Policy Data 514 |
| 6                  /ue-policy-set | UE Policy Set 516 |
| 7                  /sm-data | Session Management Policy Data 518 |
| 8                      /{usageMonId} | 520  Usage Monitoring Information 520 |
| 8                  /operator-specific-data | Operator Specific Data 522 |
| 10         /sponsor-connectivity-data | Sponsor Connectivity Data 524 |
| 11             /{sponsorId} | |
| 12         /bdt-data | BDT Data 526 |
| 13             /{bdtReferenceId} | Individual BDT Data 528 |
| 14         /subs-to-notify | Policy Data Subscriptions 530 |
| 15             /{subsId} | Individual Policy Data Subscription 532 |
| 16         /plmns | |
| 17             /{plmnId} | |
| 18                 /ue-policy-set | PLMN UE Policy Set 534 |

FIG. 5C

| RESOUORCE URI | NAME |
|---|---|
| 1 {apiRoot}/nudr-dr/<apiVersion> | |
| 2    /application-data | |
| 3       /pfds | PFD Data 540 |
| 4          /{appId} | Individual PFD Data 542 |
| 5       /influenceData | Influence Data 544 |
| 6          /{influenceId} | Individual Influence Data 546 |
| 7          /subs-to-modify | Influence Data Subscription 548 |
| 8             /{subscriptionId} | Individual Influence Data Subscription 550 |
| 9       /iptvConfigData | IPTV Configuration 552 |
| 10          /{configurationId} | Individual IPTV Configuration 554 |
| 11       /bdtPolicyData | Applied BDT Policy Data 556 |
| 12          /{bdtPolicyId} | Individual Applied BDT Policy Data 558 |
| 13       /serviceParmData | |
| 14          /{serviceParamId} | |
| 15       /subs-to-notify | |
| 16          /{subsId} | |

FIG. 6

SYSTEM AND METHOD FOR UNIFIED DATA REPOSITORIES AND APPLICATION PROGRAMMING INTERFACES FOR AVOIDING SEGMENTATION SYNCHRONIZATION

CROSS-REFERENCE TO RELATED APPLICATION

This patent application claims priority to and is a continuation of U.S. patent application Ser. No. 17/474,369, filed on Sep. 14, 2021, titled "Systems and Methods for Unified Data Repositories and Application Programming Interfaces for Avoiding Segmentation Synchronization," the disclosure of which is incorporated by reference herein in its entirety.

BACKGROUND INFORMATION

In many wireless networks, each of core network functions are implemented on specialized hardware devices. In more advanced wireless networks, core network functions are implemented as virtual core network components. One network architecture that embraces such virtualization is Service-Based Architecture (SBA). SBA brings modularity, scalability, reliability, cost-effective operability, easy deployment capability, and adaptability to networks.

In SBA, a set of Network Functions (NFs) provide the functionalities of the core network. Each NF has a specialized function and may be instantiated as a software component. Each of the NFs may act as a consumer (consumer NF) and/or a producer (producer NF) of services and may interface with one another through well-defined Application Programming Interfaces (APIs).

DETAILED DESCRIPTION OF EXAMPLE EMBODIMENTS

The following detailed description refers to the accompanying drawings. The same reference numbers in different drawings may identify the same or similar elements.

The systems and methods described herein relate to modified Application Programming Interfaces (APIs) to be used by: a Unified Data Repository (UDR) to register its resources at a Network Repository Function (NRF); Network Functions (NFs) to query the NRF to discover the UDR resources; and NFs to subscribe, at the NRF, to the NRF notification service pertaining to the UDR resources. Using the modified APIs, NFs may have the ability to retrieve both User Equipment (UE)-specific data (also referred to as "information") from the UDR and non-UE-specific data from the UDR. Without the modified APIs, the NFs would be forced to query different UDRs using unmodified APIs for the UE-specific information and non-UE-specific information. To allow NFs to obtain both non-UE-specific and UE-specific information using the unmodified APIs, at least one UDR instance must store and provide UE-specific data to NFs, and another standalone UDR instance must store and provide non-UE-specific data to NFs. In a segmented network, standalone UDRs, which store the non-UE-specific data in different segments, must be synchronized to each other. This can lead to additional network service latency and challenges to network operation and maintenance.

Figure 1A:
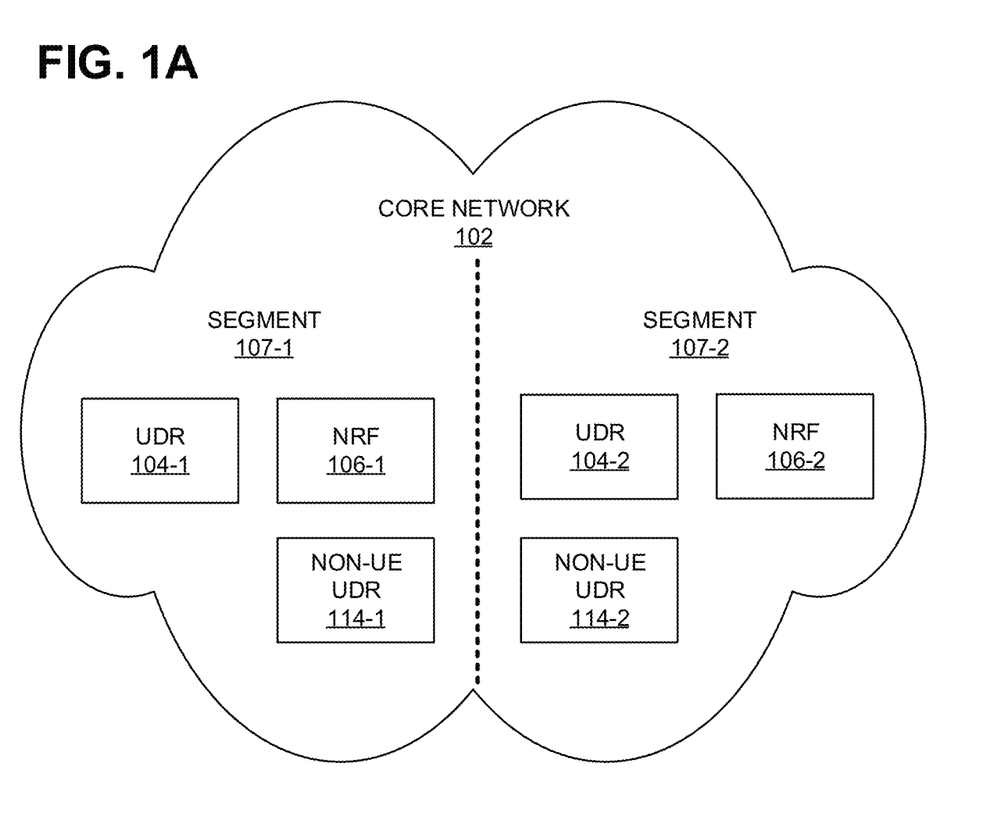
FIGS. 1A and 1B illustrate concepts of network segmentation described herein.
Figure 1B:
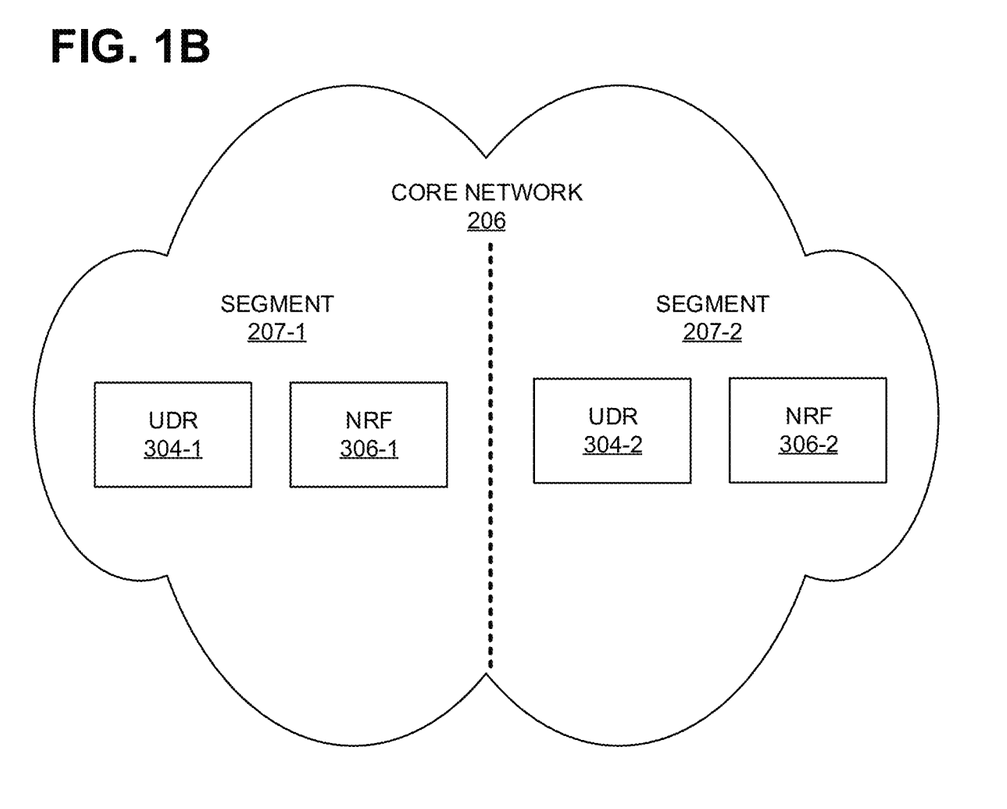

FIGS. 1A and 1B illustrate the concepts described herein. In FIG. 1A, a core network 102, such as a Fifth Generation (5G) core network, implements unmodified APIs for registering and discovering UDRs at an NRF and in FIG. 1B, a core network 206, such as a 5G core network, implements modified APIs for registering and discovering UDRs at an NRF. Each of core networks 102 and 206 (to be described in greater detail with reference to FIG. 2) is segmented to increase network resiliency and limit the failure domains. Although core network 102 is shown as including network segments 107-1 and 107-2 (generically referred to as segment 107) and core network 206 is shown as including segments 207-1 and 207-2 (generically referred to as segment 207), in an actual implementation, core networks 102 and/or 206 may include additional segments.

In FIG. 1A, segment 107-1 includes at least a UDR 104-1, an NRF 106-1, and a non-UE UDR 114-1; and segment 107-2 includes at least a UDR 104-2, an NRF 106-2, and a non-UE UDR 114-2. UDR and NRF are described in greater detail with reference to FIG. 3. Each of UDRs 104-1 and 104-2 stores and provides data associated with each UEs subscribed to communication and/or content services at core network 102. That is, UDR 104-1 and UDR 104-2 each store UE-specific data, while non UE UDRs 114-1 and 114-2 may each store and provide data that is not particular to a specific UE (non-UE-specific data).

In segment 107-1, UDR 104-1 and non-UE UDR 114-1 use particular APIs (herein referred to as unmodified APIs) to register at NRF 106-1. Other NFs in segment 107-1 use the APIs for discovering UDR 104-1 and UDR 114-1 at NRF 106-1 and for subscribing to an NRF notification service at NRF 106-1 to be notified of changes at UDRs 104-1 and UDR 114-1. Similarly, in segment 107-2. UDR 104-2 and non-UE UDR 114-2 use the unmodified APIs to register at NRF 106-2. Other NFs in segment 107-2 use the APIs for discovering UDR 104-2 and UDR 114-2 at NRF 106-2 and for subscribing to an NRF notification services at NRF 106-2 to be notified of changes at UDRs 104-2 and 114-2.

In FIG. 1A, core network 102 supports use of the unmodified APIs. However, the unmodified APIs require NFs to access UE-specific data at one UDR and non-UE-specific data at another UDR. Thus, in segment 107-1, non-UE UDR 114-1 is implemented to provide non UE-specific data to other NFs in segment 107-1 (not shown). Similarly, in segment 107-2, non-UE UDR 114-2 is implemented to provide non UE-specific data to other NFs in segment 107-2 (not shown). Unlike UDR 104-1 and UDR 104-2 that store UE-specific data, however, UDR 114-1 and UDR 114-2 must carry the same data—this requires UDRs 114-1 and 114-2 to be synchronized across segments 107-1 and 107-2, leading to increased network inefficiency and network latency. In a segmented network, synchronization across the segments is not permissible as it affects the failure domain. Therefore, maintaining the data consistency between UDR114-1 and UDR 114-2 would be a challenging and expensive process. These problems cannot be addressed by placing, in each segment 107, UDRs that each store and provide both UE-specific data and non-UE specific data as long as the unmodified APIs are used by the NFs in each segment 107, because the unmodified APIs do not permit NFs in each segment 107 to obtain both UE-specific and non-UE-specific data from the same UDR. Furthermore, the problem may be exacerbated if core network 102 includes additional segments that require core network 102 to perform additional synchronization.

In FIG. 1B, consistent with embodiments described herein, core network 206 supports the use of the modified APIs (to be described below with reference to FIG. 4) at NRFs 306. Contrary to the unmodified APIs described above, the modified APIs do not require NFs to access UE-specific data at one UDR and non-UE-specific data at another UDR. Thus, in segment 207-1, UDR 304-1 may store both non-UE-specific data and UE-specific data to service NFs in segment 207-1, and, in segment 207-2, UDR 304-2 may store both non-UE-specific data and UE-specific data to service NFs in segment 207-2. These UDRs 304 do not need to be synchronized across segments 207-1 and 207-2.

Figure 2:
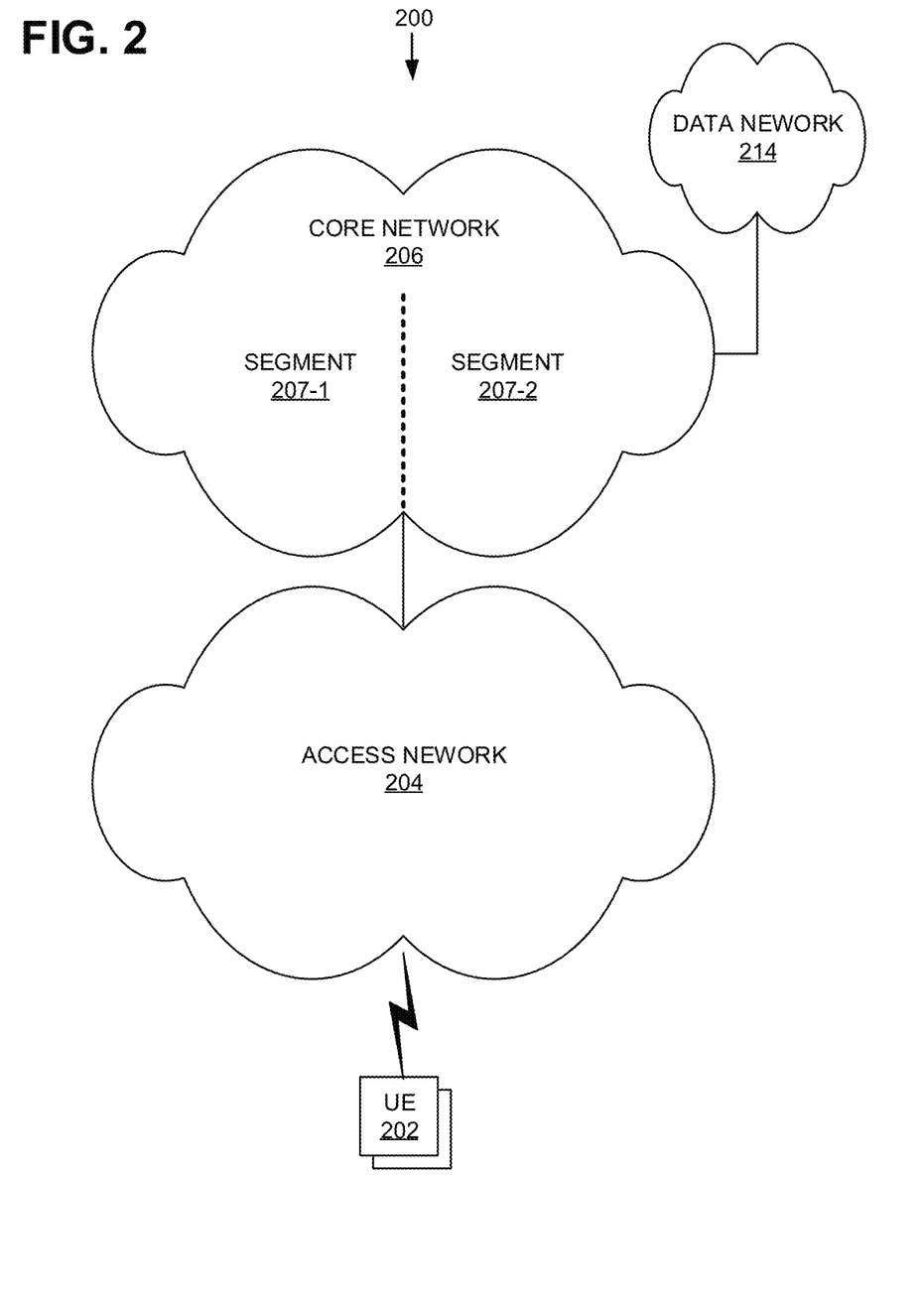
FIG. 2 illustrates an example network environment in which the systems and methods described herein may be implemented.

FIG. 2 illustrates an example network environment 200 in which the systems and methods described herein may be implemented. As shown, environment 200 may include UEs 202 (individually referred to as UE 202), an access network 204, core network 206, and a data network 214. UE 202 may include a wireless communication device, a mobile terminal, or a fixed wireless access (FWA) device. Examples of UE 202 include: a smart phone; a tablet device; a wearable computer device (e.g., a smart watch); a laptop computer; an autonomous vehicle with communication capabilities; a portable gaming system; and an Internet-of-Thing (IoT) device. UE 202 may be associated with a Subscription Permanent Identifier (SUPI).

In some implementations, UE 202 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 202 may send packets to or over access network 204. UE 202 may have the capability to select a particular network slice (to be described below) from which UE 202 can request a service. UE 202 may have the capability to connect to different Radio Access Technology (RAT) devices, such as Long-Term Evolution (LTE) or 5G base stations.

Access network 204 may allow UE 202 to access core network 206. To do so, access network 204 may establish and maintain, with participation from UE 202, an over-the-air channel with UE 202; and maintain backhaul channels with core network 206. Access network 204 may convey information through these channels, from UE 202 to core network 206 and vice versa.

Access network 204 may include an LTE radio network, a 5G radio network and/or another advanced radio network. These radio networks may operate in many different frequency ranges, including millimeter wave (mmWave) frequencies, sub 6 GHz frequencies, and/or other frequencies. Access network 204 may include many wireless stations, Central Units (CUs), Distributed Units (DUs), and devices herein referred to as Integrated Access and Backhaul (IAB) nodes.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, a PLMN, or a combination of networks. Core network 206 may allow the delivery of Internet Protocol (IP) services to UE 202, and may interface with other networks, such as data network 214.

Depending on the implementation, core network 206 may include 4G core network components (e.g., a Serving Gateway (SGW), a Packet data network Gateway (PGW), a Mobility Management Entity (MME), etc.), 5G core network components (e.g., a UDR, a NRF, a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), a Network Exposure Function (NEF), etc.), or another type of core network components. As discussed with reference to FIGS. 1A and 1B, core network 206 may be segmented to increase network operability and efficiency. FIG. 2 shows core network 206 as segmented into segment 207-1 and 207-2, although in an actual implementation, core network 206 may include more segments. Segment 207 is described below in greater detail with reference to FIG. 3.

Data network 214 may include networks that are external to core network 206. In some implementations, data network 214 may include packet data networks, such as an Internet Protocol (IP) network.

Although not shown, access network 204, core network 206, and data network 214 may be configured to provide network slicing and network segments. Advanced wireless networks, such as a 5G network, may rely on network slicing and network segments to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a network slice instance, may encompass an end-to-end virtual network with dedicated storage and/or computational resources that include access network components, clouds, transport, core network functions (NFs), Central Processing Unit (CPU) cycles, memory, etc. Furthermore, each network slice instance may be configured to meet a different set of requirements and be associated with a particular QoS, a type of service, and/or a particular group of enterprise customers associated with mobile communication devices and/or fixed wireless access (FWA) devices.

For clarity, FIG. 2 does not show all components that may be included in network environment 200 (e.g., routers, bridges, wireless access point, additional networks, additional UEs 202, wireless station, IAB nodes, a Multi-Access Edge Computing (MEC) clusters or networks, etc.). Depending on the implementation, network environment 200 may include additional, fewer, different, or a different arrangement of components than those illustrated in FIG. 2.

Figure 3:
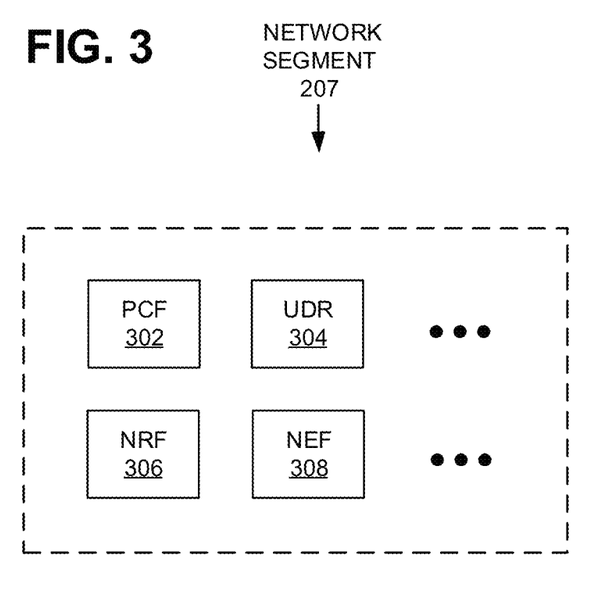
FIG. 3 illustrates example functional components of a segment of a core network according to an implementation.

FIG. 3 illustrates example functional components of network segment 207 in core network 206 when core network 206 is implemented as a 5G core network. Each segment 207 may include a number of 5G core network components that may not be synchronized or replicated across the entirety of core network 206 spanned by the segments. As shown, segment 207 may include a PCF 302, a UDR 304, an NRF 306, and an NEF 308.

Depending on the implementation, network segment 207 may include additional, fewer, or different core components than those illustrated in FIG. 3. For example, in a different implementation, segment 207 may include an AMF, an SMF, an NSSF, an Authentication Server Function (AUSF), and a Charging Function (CHF). Furthermore, depending on the implementation, through network slicing and network virtualization, core components 302-308 and other core components may be implemented in a data center or a MEC cluster in access network 204 and/or data network 214.

PCF 302 may support policies to control network behavior, provide policy rules to control plane functions (e.g., to an SMF), access subscription information relevant to policy decisions, perform policy decisions, and/or perform other types of processes associated with policy enforcement. In some implementations, PCF 302 may include a rule for a node to redirect UE 202-originated IP traffic to a selected endpoint. PCF 302 may query NRF 306 to discover UDR 304 that stores the non-UE-specific data and/or UE-specific data using the modified NRF APIs. In addition, PCF 302 may subscribe to the NRF notification service regarding UDR data using the modified NRF API.

UDR 304 may include a repository for subscription data, subscriber policy data, session data, and application data. UDR 304 may retrieve, and provide the data to NFs in segment 207. Resources in UDR 304 are described in greater detail with reference to FIGS. 5A-5C. UDR 304 may register with NRF 306 using the modified NRF API, to be described with reference to FIG. 4.

As discussed above, in this particular implementation, UDR 304 may store both the UE-specific data and non-UE-specific data and thus does not need to be synchronized across segment boundaries. UE-specific data is associated with Subscription Permanent Identifiers (SUPIs) and non-UE-specific data is not associated with SUPIs. Other NFs in segment 207 may discover non-UE specific data and UE-specific data using the modified NRF API. In implementations that only support the unmodified NRF API, a dedicated UDR would be needed to store non-UE-specific data and to allow other NFs to discover the dedicated UDR. Such dedicated UDRs would be needed in each segment and synchronized across segment boundaries.

NRF 306 may support registration functions, discovery functions, and NF subscriptions. NRF 306 may maintain profiles of available NF instances and their supported services. An NF profile may include an NF instance identifier (ID), an NF type, a Public Land Mobile Network (PLMN) ID associated with the NF, network slice IDs associated with the NF, capacity information for the NF, a data set ID (referred to herein as DataSetId) that identifies different types of data stored at UDR 304, service authorization information for the NF, supported services associated with the NF, endpoint information for each supported service associated with the NF, and/or other types of NF information. When an NF is instantiated, the NF may register with NRF 306, using its NF profile. Furthermore, when an NF needs to obtain information about another NF, the NF may query NRF 306 for the information. In response, NRF 306 may search its database of NF profiles and return results that match the query criteria.

NRF 306 may allow UDR 304 to register both non-UE-specific data UE-specific data at NRF 306 using the modified NRF API. In addition, NRF 306 may allow NFs (e.g., PCF 302 and NEF 308) to discover non-UE-specific data and UE-specific data at UDR 304 using the modified NRF API. Furthermore, NRF 304 may allow NFs to subscribe to its notification service pertaining to the non-UE-specific data and UE-specific data.

NEF 308 may expose capabilities and events to other NFs, including third party NFS, AFs, edge computing NFs (e.g., MEC applications), and/or other types of NFs. Furthermore, NEF 308 may secure provisioning of information from external applications to core network 206 and/or segment 207, translate information between core network 206 and/or segment 207 and devices/networks external to core network 206 and/or segment 207, support Packet Flow Description (PFD) functions, and/or perform other types of network exposure functions. NEF 308 may include a slice manager that selects a network slice for a particular UE 202 based on a request received from a particular application function (AF). NEF 308 may discover UE-specific and non-UE-specific data by querying NRF 306 using the modified NRF API. NEF 308 may also subscribe to the notification service regarding the data at NRF 306 using the modified NRF API.

Figure 4:
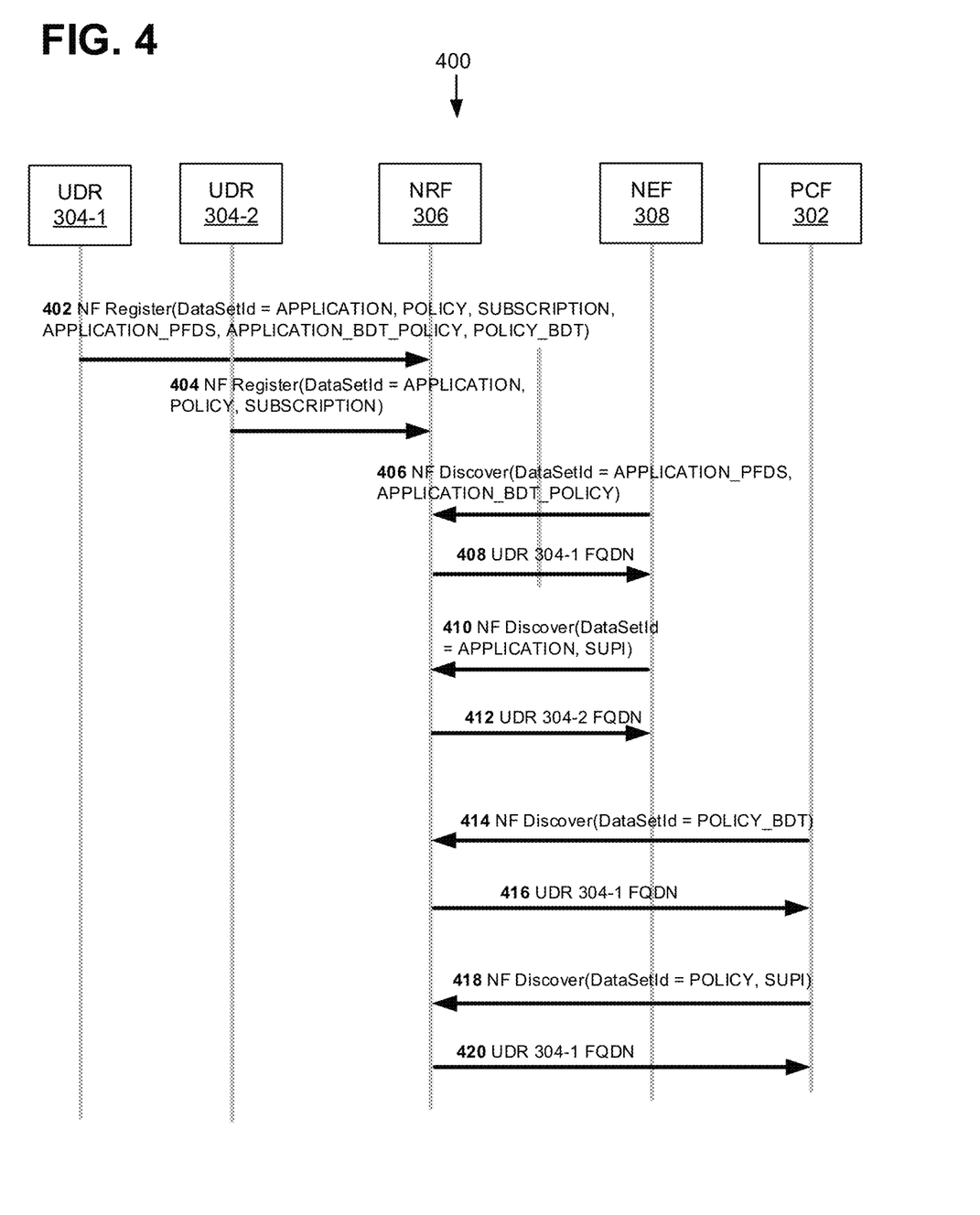
FIG. 4 illustrates an example signal flow diagram that is associated with registering Unified Data Repositories (UDRs) at a Network Repository Function (NRF) and discovering UDRs at the NRF, according to an implementation.
Figure 5A:
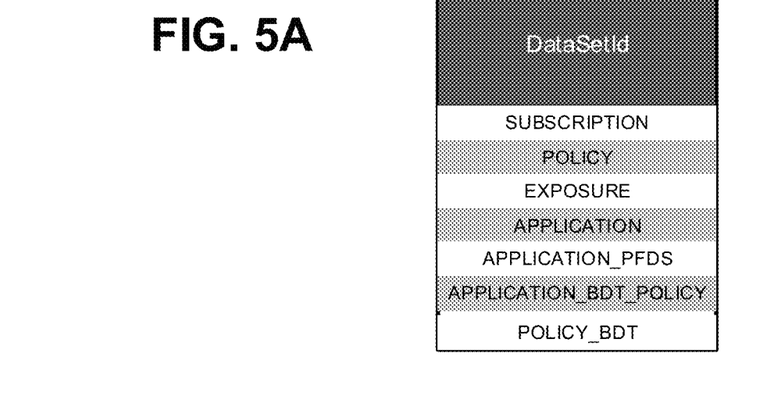
FIG. 5A illustrates example enumeration values for registering UDR resources at an NRF, according to an implementation.

FIG. 4 illustrates an example signal flow diagram 400 that is associated with registering UDRs at an NRF and discovering the UDRs at NRF. In diagram 400, NFs that exchange messages include PCF 302, UDR 304-1, UDR 304-2, NRF 306, and NEF 308. For clarity, other NFs are not depicted. UDR 304-1 and UDR 304-2 may or may not be in the same segment 207. As shown, UDR 304-1 may register itself at NRF 306 by invoking the modified NRF API. The NRF may include, for example, NF Register (DataSetId=APPLICATION, POLICY, SUBSCRIPTION, APPLICATION_PFDS, APPLICATION_BDT_POLICY, POLICY_BDT) 402. In API call 402, DataSetId represents enumerated values that specify the resources for which UDR 304 registers at NRF 306. FIG. 5A illustrates a list of enumeration values and what each value represents. Depending on the implementation, DataSetId may include additional, fewer, and/or different enumeration values.

As shown in FIG. 5A, the enumeration values may include SUBSCRIPTION, POLICY, EXPOSURE, APPLICATION, APPLICATION_PFDS, APPLICATION_BDT_POLICY, and POLICY_BDT. PFDS stands for Packet Flow Descriptors or Descriptions, and BDT stands for Background Data Transfer. SUBSCRIPTION, POLICY, EXPOSURE, and APPLICATION refer to data or resources that pertain to subscription, policy, exposure, and application. Some of such data may be associated with SUPIs (or particular UEs). APPLICATION_PFDS, APPLICATION_BDT_POLICY, and POLICY_BDT refer to application and policy data that are not associated with a SUPI or a particular UE and thus comprise non-UE-specific data.

Referring back to FIG. 4, when a UDR 304 (e.g., UDE 304-1 or 304-2) registers at NRF 306 using NF Register API, with DataSetId set to one or more of the enumerated values, UDR 304 indicates to NRF 306 that particular resources (or data) corresponding to the enumerated values are available for access at UDR 304. Thus, for example, call 402 has DataSetId set to APPLICATION, POLICY, SUBSCRIPTION, APPLICATION_PFDS, APPLICATION_BDT- _POLICY, and POLICY_BDT. These DataSetId values indicate that UDR 304-1 may provide UE-specific application, policy, and subscription data, and non-UE specific application and policy data to other NFS.

As further shown, flow diagram 400 includes UDR 304-2 registering at NRF 306, by invoking NF Register (DataSetId=APPLICATION, POLICY, SUBSCRIPTION) 404. In call 404, DataSetId is set to APPLICATION, POLICY, and SUBSCRIPTION, indicating that UDR 304-2 includes UE-specific application, policy, and subscription data.

After the registration of UDR 304-1 and UDR 304-2 at NRF 306, NFs may query NRF 306, by issuing discovery requests to NRF 306, for the identities of UDRs that may provide particular data. Flow diagram 400 shows example discovery requests from two NFs—NEF 308 and PCF 302. As shown, NEF 308 makes NF Discover (DataSetId=APPLICATION_PFDS, APPLICATION_BDT_POLICY) call 406. In call 406, DataSetId is set to APPLICATION_PFDS and APPLICATION_BDT_POLICY, indicating that NEF 308 is searching for a UDR 304 that can provide non-UE-specific application and policy data. In response, NRF 306 sends a reply 408 that identifies a fully qualified domain name (FQDN) of UDR 304-1.

Flow diagram 400 also shows NEF 308 making a second discovery request NF Discover (DataSetId=APPLICATION, SUPI) 410. In the call 410, DataSetId is set to APPLICATION, along with a SUPI value, indicating that NEF 308 is searching for a UDR 304 that can provide UE-specific application data that pertains to the UE with the specified SUPI value. In response to call 410, NRF 306 sends a reply 412 with the fully qualified domain name of UDR 304-2, indicating that the data can be obtained from UDR 304-2.

Flow diagram 400 further shows PCF 302 making an API call NF Discover (DataSetId=POLICY_BDT) 414. In the call 414, DataSetId is set to POLICY_BDT, indicating that PCF 302 is searching for a UDR 304 that can provide non-UE-specific policy data. In response, NRF 306 sends a reply 416 that includes a fully qualified domain name of UDR 304-1. Flow diagram 400 further shows PCF 302 making a second discovery request NF Discover (DataSetId=POLICY, SUPI) 418. In the call 418, DataSetId is set to POLICY, along with a SUPI value, indicating that PCF 302 is searching for a UDR 304 that can provide UE-specific policy data that pertains to the UE with the specified SUPI value. In response to call 418, NRF 306 sends a reply 420 with the fully qualified domain name of UDR 304-1, indicating that the data can be obtained from UDR 304-1.

Figure 5B:
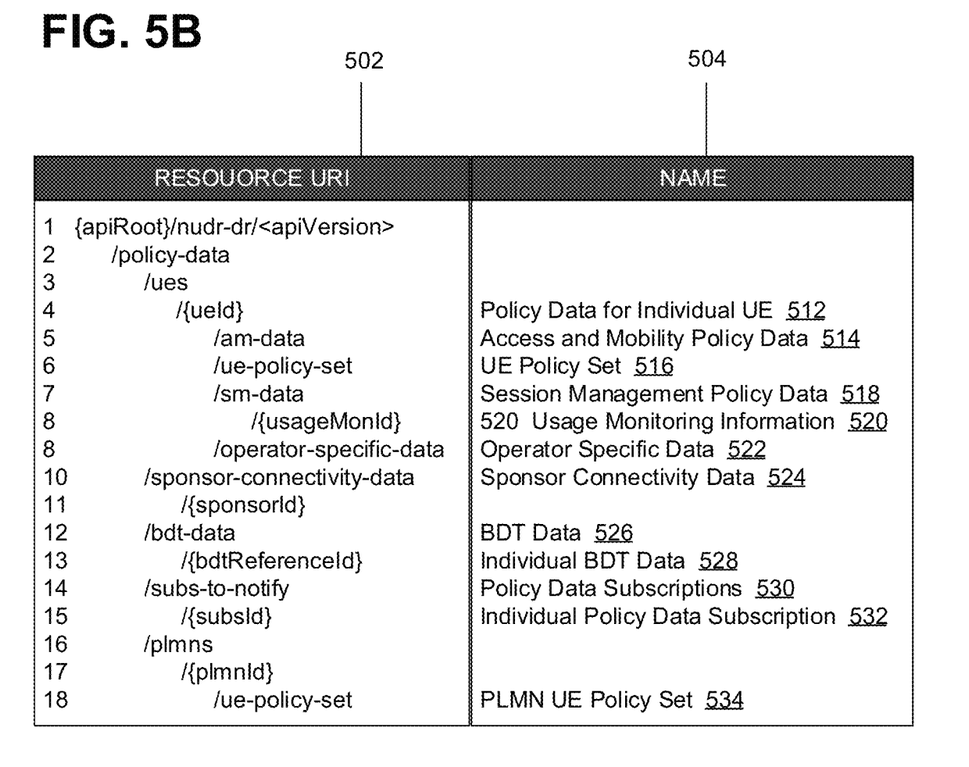
FIG. 5B illustrates an example Universal Resource Identifier (URI) structure of an Application Programming Interface (API) for policy data, according to an implementation.

FIG. 5B illustrates an example Universal Resource Identifier (URI) structure 502 of an API for policy data, according to an implementation. In structure 502, some of the numbered lines, each of which includes a portion of a resource URI, may correspond to a resource at UDR 304 that registers via NF Register API. Each name in NAME column 504 corresponds to the name of a particular resource designated by the URI portion at the same line as the name. For example, at line 4, the name of the resource is Policy Data 512 (see NAME column 504) for Individual UE. At the same line, a portion of the URI is given as /{ueid}—which represents multiple UE ID directories. The full URI may be obtained by concatenating to the left, the URI portions that overhang the portion at the line. For example, for /{ueid} at line 4, the full URI is given by concatenating {apiRoot}/nudr-dr/<apiVersion>(at line 1), /policy-data (at line 2), /ues (at line 3), and/{ueId} (at line 4) that overhang/{ueid}. The result of the concatenation is {apiRoot}/nudr-dr/<apiVersion>/policy-data/ues/{ueId}, where <apiVersion> would be replaced by the alphanumerical character string representing the version of the API.

In FIG. 5B, NAME column 504 includes: a Policy Data for Individual UE 512, an Access and Mobility Policy Data 514, a UE Policy Set 516, a Session Management Policy Data 518, a Usage Monitoring Information 520, an Operator Specific Data 522, a Sponsor Connectivity Data 524, a BDT Data 526, an Individual BDT Data 528, a Policy Data Subscriptions 530, an Individual Policy Data Subscription 532, and a PLMN UE Policy Set 534. Depending on the implementation, however, there may be more resources with URIs and names at UDR 304 than those shown in FIG. 5B.

Policy Data for Individual UE 512 designates, for a subscriber, multiple policy data sets that include: Access and Mobility (AM) policy data, UE policy set data, Session Management (SM) policy data, usage monitoring data, and operator specific policy data. The names of these data sets are shown in NAME column 504 as: Access and Mobility Policy Data 514, UE Policy Set 516, Session Management Policy Data 518, Usage Monitoring Information 520, and Operator Specific Data 522. Sponsor Connectivity Data 524 identifies sponsored connectivity information for a given sponsor ID. BDT Data 526 specifies multiple BDT data sets, and Individual BDT Data 528 designates each of the multiple BDT data sets. Policy Data Subscriptions 530 identifies data associated with multiple subscriptions to the service for receiving notifications for changes to policy data, and Individual Policy Data Subscription 532 identifies data for each of the multiple subscriptions. PLMN UE Policy Set designates UE policy set for a PLMN 534.

Figure 5C:
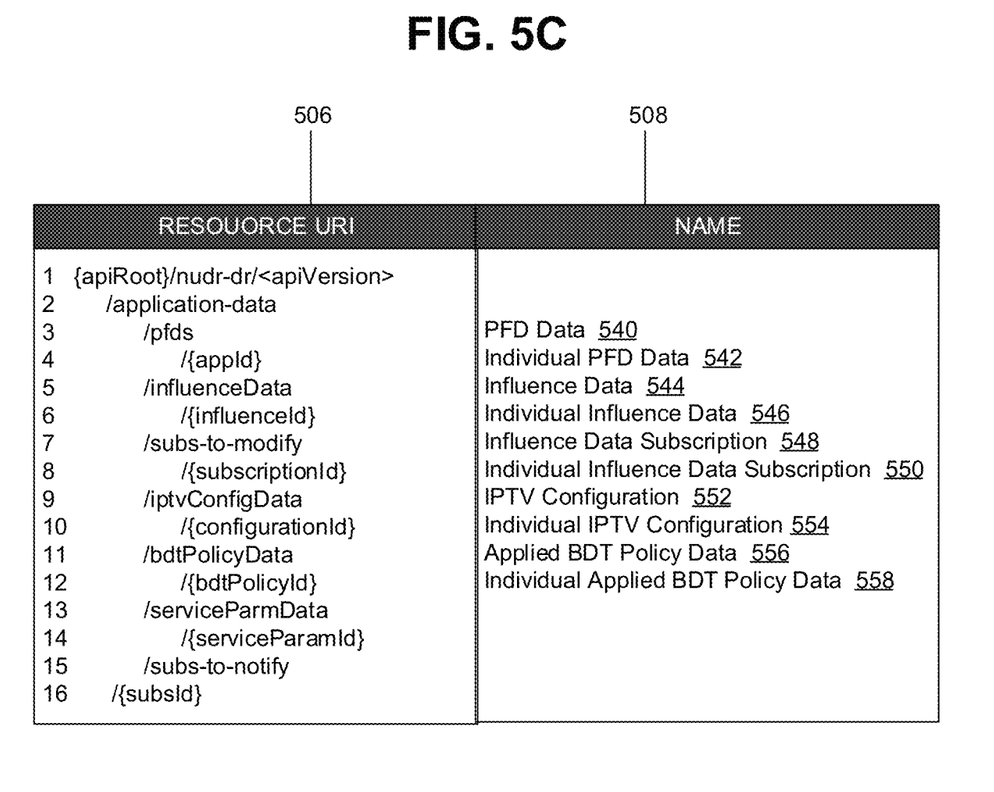
FIG. 5C illustrates an example URI structure of the API for application data, according to an implementation.

FIG. 5C illustrates an example URI structure 506 of the API for application data, according to an implementation. As in FIG. 5B, in structure 506, some of the numbered lines, each of which includes a portion of a resource URI, may correspond to a resource at UDR 304 that registers at NRF 306 via NF Register API. Each name in NAME column 508 corresponds to the name of a particular resource designated by the URI portion at the same line as the name. For example, at line 6, the name of the resource is Individual Influence Data 546. At the same line, a portion of the URI is shown as /{influenceId}—which represents multiple influence ID directories. The full URI may be obtained by concatenating to the left, the URI portions that overhang the portion at the line. For example, for /{InfluenceId} at line 6, the full URI is given by concatenating {apiRoot}/nudr-dr/<apiVersion> (at line 1), /application-data (at line 2), /influenceData (at line 5), and/{influenceId} (at line 6). The result of the concatenation is {apiRoot}/nudr-dr/<apiVersion>/application-data/influenceData/{influenceId}, where <apiVersion> would be replaced by the alphanumerical character string that represents the version of the API.

In FIG. 5C, NAME column 508 includes PFD Data 540, Individual PFD Data 542, Influence Data 544, Individual Influence Data 546, Influence Data Subscription 548, Individual Influence Data Subscription 550, IPTV Configuration 552, Individual IPTV Configuration 554, Applied BDT Policy Data 556, and Individual Applied BDT Policy Data 558.

PFD Data 540 designates, for multiple applications, packet flow data sets. Individual PFD Data 542 designates a packet flow data set for a particular application. Influence Data 544 may include session influence data for given services, Single-Network Slice Selection Assistance Information (S-NSSAIs), and Data Network Names (DNNs) or Internal Group Identifiers or SUPIs. Individual Influence Data 546 specifies a set of influence data for particular Influence ID. Influence Data Subscription 548 identifies subscription data directory for holding multiple sets of individual subscription data. Individual Influence Data Subscription 550 identifies each set of the multiple sets of individual subscription data. IPTV configuration 552 identifies IPTV configurations for configuration identifiers, given S-NSSAIs, DNNs, SUPIs, or Internal Group Identifiers. Individual IPTV 554 configuration identifies IPTV configurations for an individual configuration ID. Applied BDT Policy Data 556 specifies applied BDT policy data. Individual Applied BDT Policy Data 558 identifies applied BDT policy data for an individual applied BDT policy data designated by /{bdtPolicyId}.

Referring back to FIG. 5A, the enumerated values APPLICATION_PFDS, APPLICATION_BDT_POLICY, and POLICY_BDT identify resources designated by, respectively, PFD Data 540, Applied BDT Policy Data 556, and BDT Data 526. As discussed above, each of the enumerated values can be used in the APIs for UDR registration at NRF 306, discovery of UDR 304 at NRF 306, and subscribing to the notification service at NRF 306 for changes regarding the specified data. Without the modified API, these data would need to be hosted on dedicated UDRs in multiple segments, which in turn would require synchronization across segment boundaries. Other enumerated values, SUBSCRIPTION, POLICY, APPLICATION, and EXPOSURE, identify portions of application, subscription, policy and exposure data, where each of the portions may be identified by a SUPI. Both the modified and unmodified API calls may use these enumerated values.

Figure 6:
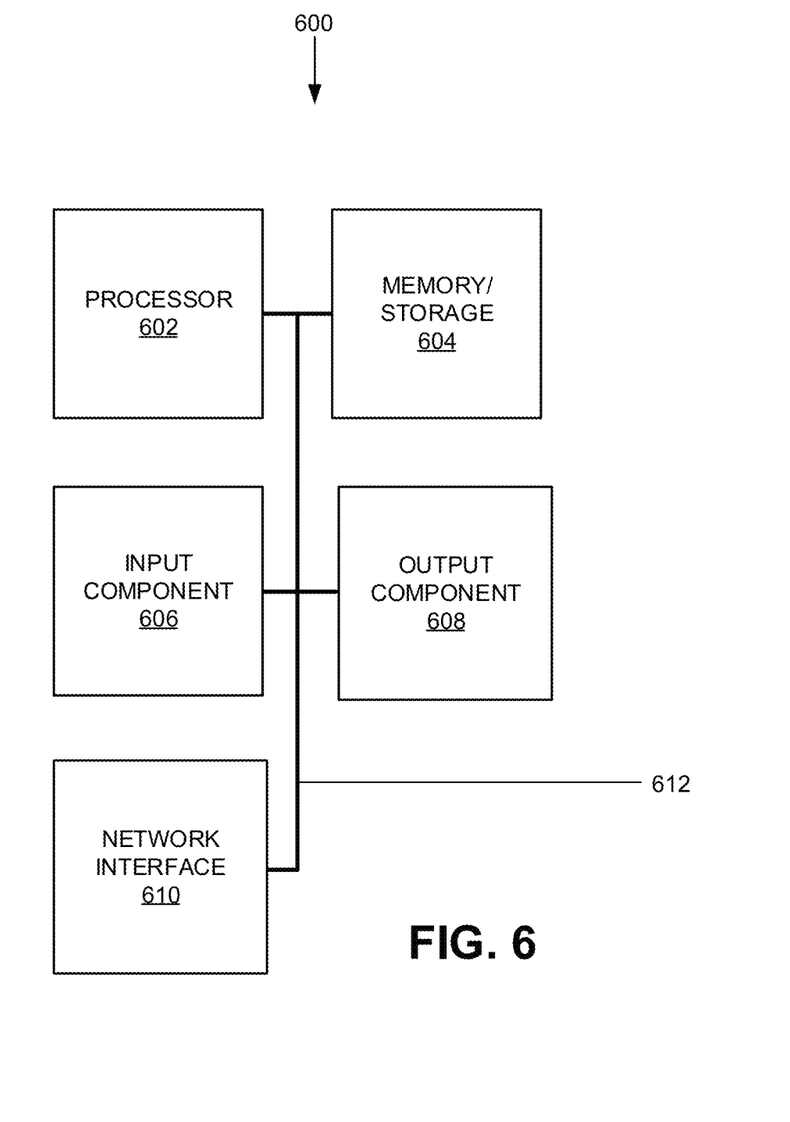
FIG. 6 depicts components of an example network device, according to an implementation.

FIG. 6 depicts example components of an example network device 600. Network device 600 corresponds to or is included in UE 202 and any of the network components of FIGS. 1-3 (e.g., a router, a network switch, servers, gateways, MEC clusters, PCF 302, UDR 304, NRF 306, NEF 308, etc.). As shown, network device 600 includes a processor 602, memory/storage 604, input component 606, output component 608, network interface 610, and communication path 612. In different implementations, network device 600 may include additional, fewer, different, or a different arrangement of components than the ones illustrated in FIG. 6. For example, network device 600 may include a display, network card, etc.

Processor 602 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 600 and/or executing programs/instructions.

Memory/storage 604 may include static memory, such as read only memory (ROM), and/or dynamic memory, such as random access memory (RAM), or onboard cache, for storing data and machine-readable instructions (e.g., programs, scripts, etc.).

Memory/storage 604 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 604 may be external to and/or removable from network device 600. Memory/storage 604 may include, for example, a Universal Serial Bus (USB) memory stick, a dongle, a hard disk, off-line storage, a Blu-Ray® disk (BD), etc. Memory/storage 604 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 606 and output component 608 may provide input and output from/to a user to/from network device 600. Input and output components 606 and 608 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 600.

Network interface 610 may include a transceiver (e.g., a transmitter and a receiver) for network device 600 to communicate with other devices and/or systems. For example, via network interface 610, network device 600 may communicate with wireless station 208.

Network interface 610 may include an Ethernet interface to a LAN, and/or an interface/connection for connecting network device 600 to other devices (e.g., a Bluetooth interface). For example, network interface 610 may include a wireless modem for modulation and demodulation.

Communication path 612 may enable components of network device 600 to communicate with one another.

Network device 600 may perform the operations described herein in response to processor 602 executing software instructions stored in a non-transient computer-readable medium, such as memory/storage 604. The software instructions may be read into memory/storage 604 from another computer-readable medium or from another device via network interface 610. The software instructions stored in memory or storage (e.g., memory/storage 604, when executed by processor 602, may cause processor 602 to perform processes that are described herein. For example, PCF 302, UDR 304, NRF 306, and NEF 308 may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of arrows have been described above with regard to the flow of messages in FIG. 4, the order of the arrows and messages may be modified in other implementations. In addition, non-dependent arrows may represent messages that can be sent or processed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network comprising a first network segment and a second network segment, configured to:
   synchronize a first Unified Data Repository (UDR) in the first network segment to another UDR in the second network segment if the first UDR includes only non-User Equipment (UE)-specific data, and
   not synchronize the first UDR to the other UDR if the first UDR includes both non-UE specific data and UE-specific data,
   wherein the first network segment includes a first Network Repository Function (NRF), and the second network segment includes a second NRF, and
   wherein the first network segment and the second network segment are part of a same wireless network.

2. The network of claim 1, wherein the first NRF is configured to:
   receive a registration request from the first UDR, wherein the registration request indicates that the first UDR includes both non-UE-specific data and UE specific data; and
   store registration information provided in the registration request.

3. The network of claim 2, wherein the first NRF is further configured to:
   receive a discovery request to identify a UDR that includes at least one of application data, exposure data, policy data, or subscription data, and wherein the discovery request specifies a Subscription Permanent Identifier (SUPI).

4. The network of claim 3, wherein the first NRF is further configured to:
   send a message in response to the discovery request, wherein the response includes a fully qualified domain name (FQDN) of the first UDR.

5. The network of claim 2, wherein the registration request specifies one or more enumeration values, wherein each of the enumeration values specifies one of:
   SUBSCRIPTION;
   POLICY;
   EXPOSURE;
   APPLICATION;
   APPLICATION_PFDS; or
   APPLICATION_BDT_POLICY, POLICY_BDT.

6. The network of claim 5, wherein APPLICATION_PFDS identifies, in the first UDR, a resource that corresponds to Packet Flow Descriptions.

7. The network of claim 1, wherein the first network segment includes a network function that queries the first NRF for accessing the first UDR, wherein the network function includes one of a Policy Control Function (PCF) or a Network Exposure Function (NEF).

8. A method comprising:
   determining whether a first Unified Data Repository (UDR) in a first network segment included in a network comprises only non-User Equipment (UE)-specific data or both non-UE-specific and UE specific data;
   synchronizing the first UDR to another UDR in a second network segment included in the network if the first UDR comprises only non-UE specific data, and
   not synchronizing the first UDR to the other UDR if the first UDR comprises both non-UE specific data and UE-specific data,
   wherein the first network segment includes a first Network Repository Function (NRF), and the second network segment includes a second NRF, and
   wherein the first network segment and the second network segment are part of a same wireless network.

9. The method of claim 8, further comprising:
   receiving, by the first NRF included in the first network segment, a registration request from the first UDR, wherein the registration request indicates that the first UDR includes both non-UE-specific data and UE specific data; and
   storing registration information provided in the registration request.

10. The method of claim 9, further comprising:
    receiving, by the first NRF, a discovery request to identify a UDR that includes at least one of application data, exposure data, policy data or subscription data, and wherein the discovery request specifies a Subscription Permanent Identifier (SUPI).

11. The method of claim 10, further comprising:
    sending, by the first NRF, a message in response to the discovery request, wherein the response includes a fully qualified domain name (FQDN) of the first UDR.

12. The method of claim 9, wherein the registration request specifies one or more enumeration values, wherein each of the enumeration values specifies one of:
    SUBSCRIPTION;
    POLICY;
    EXPOSURE;
    APPLICATION;
    APPLICATION_PFDS; or
    APPLICATION_BDT_POLICY, POLICY_BDT.

13. The method of claim 12, wherein APPLICATION_PFDS identifies, in the first UDR, a resource that corresponds to Packet Flow Descriptions.

14. The method of claim 8, wherein the first network segment includes a network function that queries the first NRF for accessing the first UDR, wherein the network function includes one of a Policy Control Function (PCF) or a Network Exposure Function (NEF).

15. A non-transitory computer-readable medium comprising processor-executable instructions, which when executed by one or more processors in a first network segment included in a network, cause the one or more processors to:
synchronize the first Unified Data Repository (UDR) in the first network segment to another UDR in a second network segment in the network if the first UDR includes only non-User Equipment (UE)-specific data, and
not synchronize the first UDR to the other UDR if the first UDR includes both non-UE specific data and UE-specific data,
wherein the first network segment includes a first Network Repository Function (NRF), and the second network segment includes a second NRF, and
wherein the first network segment and the second network segment are part of a same wireless network.

16. The non-transitory computer-readable medium of claim 15, wherein the first NRF is configured to:
receive a registration request from the first UDR, wherein the registration request indicates that the first UDR includes both non-UE-specific data and UE specific data; and
store registration information provided in the registration request.

17. The non-transitory computer-readable medium of claim 16, wherein the first NRF is further configured to:
receive a discovery request to identify a UDR that includes at least one of application data, exposure data, policy data, or subscription data, and wherein the discovery request specifies a Subscription Permanent Identifier (SUPI).

18. The non-transitory computer-readable medium of claim 17, wherein the first NRF is further configured to:
send a message in response to the discovery request, wherein the response includes a fully qualified domain name (FQDN) of the first UDR.

19. The non-transitory computer-readable medium of claim 16, wherein the registration request specifies one or more enumeration values, wherein each of the enumeration values specifies one of:
SUBSCRIPTION;
POLICY;
EXPOSURE;
APPLICATION;
APPLICATION_PFDS; or
APPLICATION_BDT_POLICY, POLICY_BDT.

20. The non-transitory computer-readable medium of claim 19, wherein APPLICATION_PFDS identifies, in the first UDR, a resource that corresponds to Packet Flow Descriptions.

* * * * *